(12) United States Patent
Taunton et al.

(10) Patent No.: US 9,465,611 B2
(45) Date of Patent: Oct. 11, 2016

(54) PROCESSOR EXECUTION UNIT WITH CONFIGURABLE SIMD FUNCTIONAL BLOCKS FOR COMPLEX NUMBER OPERATIONS

(75) Inventors: Mark Taunton, Landbeach (GB); Andrew Jon Dawson, Bradley Stoke (GB)

(73) Assignee: Broadcom Corporation, Irvine, CA (US)

( * ) Notice: Subject to any disclaimer, the term of this patent is extended or adjusted under 35 U.S.C. 154(b) by 544 days.

(21) Appl. No.: 10/956,091

(22) Filed: Oct. 4, 2004

(65) Prior Publication Data

US 2005/0193185 A1  Sep. 1, 2005

Related U.S. Application Data

(60) Provisional application No. 60/507,522, filed on Oct. 2, 2003.

(51) Int. Cl.
*G06F 9/30* (2006.01)
*G06F 9/38* (2006.01)
*G06F 7/48* (2006.01)

(52) U.S. Cl.
CPC ......... *G06F 9/30014* (2013.01); *G06F 7/4806* (2013.01); *G06F 9/3001* (2013.01); *G06F 9/30036* (2013.01); *G06F 9/3873* (2013.01); *G06F 9/3887* (2013.01)

(58) Field of Classification Search
CPC ............... G06F 9/3887; G06F 7/4806; G06F 15/7867; G06F 9/3001; G06F 9/30036; G06F 9/3873
USPC ........................................................ 712/22
See application file for complete search history.

(56) References Cited

U.S. PATENT DOCUMENTS

| | | | |
|---|---|---|---|
| 5,669,010 A * | 9/1997 | Duluk, Jr. | 712/221 |
| 5,872,986 A * | 2/1999 | Heeb | 712/1 |
| 6,247,036 B1 * | 6/2001 | Landers et al. | 708/603 |
| 6,377,970 B1 | 4/2002 | Abdallah et al. | |
| 6,385,634 B1 * | 5/2002 | Peleg et al. | 708/490 |
| 6,446,195 B1 * | 9/2002 | Ganapathy et al. | 712/221 |
| 6,839,728 B2 * | 1/2005 | Pitsianis et al. | 708/404 |
| 6,883,084 B1 * | 4/2005 | Donohoe | 712/1 |
| 7,062,635 B2 * | 6/2006 | Bosshart | 712/218 |

(Continued)

OTHER PUBLICATIONS

Tyler et al.; "AltiVec: Bringing Vector Technology to the PowerPC Processor Family"; 1999; IEEE.*

(Continued)

*Primary Examiner* — Benjamin Geib
(74) *Attorney, Agent, or Firm* — Sterne, Kessler, Goldstein & Fox PLLC (57) ABSTRACT

Methods and systems for executing SIMD instructions that efficiently implement new SIMD instructions and conventional existing SIMD MAC-type instructions, while avoiding replication of functions in order to keep the size of the logic circuit size to as low a level as can reasonably be achieved. An instruction unit executes Single Instruction Multiple Data instructions, including instructions acting on operands representing complex numbers. The instruction unit includes functional blocks that are commonly utilized to execute a plurality of the instructions, wherein the plurality of instructions utilize various individual functional blocks in various combinations with one another. The plurality of instructions is optionally executed in a pipeline fashion.

18 Claims, 9 Drawing Sheets

MULTIPLY AND ADD/SUBTRACT BLOCK DETAIL FOR CMULH

(56) References Cited

U.S. PATENT DOCUMENTS

| | | |
|---|---|---|
| 7,062,637 B2 * | 6/2006 | Ganapathy et al. .......... 712/221 |
| 2003/0145030 A1 * | 7/2003 | Sheaffer ........................ 708/523 |

OTHER PUBLICATIONS

Clarke, P. "Broadcom's Firepath combines RISC, DSP elements," 2 pages, printed from www.commsdesign.com/showArticle.jhtml?articleID=10808435, 2 pages (Jun. 13, 2001).

Wilson, S., *Firepath™ Processor Architecture and Microarchitecture*, 24 pages, downloaded form www.hotchips.org/archives/hc14, (presented Aug. 20, 2002).

Proakis, J.G. and Manolakis, D.G., *Digital Signal Processing: Principles, Algorithms, and Applications*, Second Edition, Macmillan Publishing Company, pp. 684-760 (1992).

*Hot Chips 14 Archives* (2002) *General Information*, 5 pages, printed from http://www.hotchips.org/archives/hc14/, (2002).

*BCM6410/6420 Product Brief*, 2 pages, Broadcom Corporation (2003).

\* cited by examiner

TOP-LEVEL BLOCKS

FIG.1

CMULH DATA FLOW

FIG.2

CMACH DATA PROCESSING FLOW
FIG.3

BFLYH DATA PROCESSING FLOW

FIG.4

BFLYH-CVT DATA PROCESSING FLOW

FIG.5

MULTIPLY AND ADD/SUBTRACT BLOCK DETAIL FOR CMULH

FIG.6

MULTIPLY, ADD/SUBTRACT AND ACCUMULATE BLOCK
DETAIL FOR CMACH ET AL.

PROCESSOR EXECUTION UNIT WITH CONFIGURABLE SIMD FUNCTIONAL BLOCKS FOR COMPLEX NUMBER OPERATIONS

CROSS-REFERENCE TO RELATED APPLICATIONS

This application claims the benefit of U.S. Provisional Application No. 60/507,522, filed Oct. 2, 2003, by Taunton et al., entitled "Processor Execution Unit for Complex Operations," incorporated herein by reference in its entirety.

COPYRIGHT NOTICE

A portion of the disclosure of this patent document contains material which is subject to copyright protection. The copyright owner has no objection of the facsimile reproduction by any one of the patent document or patent disclosure, as it appears in the Patent and Trademark Office patent files or records, but otherwise reserves all copyright rights whatsoever.

BACKGROUND OF THE INVENTION

1. Field of the Invention

The invention relates to execution units for executing complex operations.

2. Related Art

SIMD stands for "Single Instruction Multiple Data" and describes a style of digital processor design in which a single instruction can be issued to control the processing of multiple data values in parallel (all being processed in a similar manner).

Increasing SIMD instruction complexity leads to needs for more efficient methods and systems for executing SIMD instructions.

What are needed therefore, are methods and systems that can efficiently implement new SIMD instructions and conventional existing SIMD instructions that perform various forms of multiply and multiply-accumulate (MAC) operations, while avoiding replication of functions in order to keep the size of the logic circuit to as low a level as can reasonably be achieved.

SUMMARY OF THE INVENTION

The present invention is directed to improved methods and systems for executing SIMD instructions. The invention includes methods and systems that efficiently implement new SIMD instructions—particularly instructions supporting operations on complex numbers such as multiplication, multiplication-and-accumulation, and operations in support of performance of the Fast Fourier Transform (FFT)—and conventional existing SIMD multiply and MAC operations, while avoiding replication of functions in order to keep the size of the logic circuit size to as low a level as can reasonably be achieved.

The invention provides an instruction unit that executes Single Instruction Multiple Data instructions. The instruction unit (also known as the complex execution unit) includes functional blocks that are commonly utilized to execute a plurality of the instructions, wherein the plurality of instructions utilize various individual functional blocks in various combinations with one another. The plurality of instructions is optionally executed in a pipeline fashion.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

DETAILED DESCRIPTION OF THE INVENTION

I. Introduction

A. Complex Instructions

The present invention is directed to methods and systems for implementing complex instructions (i.e., instructions acting on operands representing complex numbers) such as those described in one or more of the following U.S. Patent applications:

"Methods for Performing Multiplication Operations on Operands Representing Complex Numbers," U.S. patent application Ser. No. 10/951,867, filed Sep. 29, 2004, now U.S. Pat. No. 7,546,329, incorporated herein by reference in its entirety;

"Methods for Performing Multiply-Accumulate Operations on Operands Representing Complex Numbers." U.S. patent application Ser. No. 10/953,421, filed Sep. 30, 2004, now U.S. Pat. No. 7,546,330, incorporated herein by reference in its entirety;

"Method, System, and Computer Program Product for Executing SIMD Instruction for Flexible FFT Butterfly," U.S. patent application Ser. No. 10/952,169, filed Sep. 29, 2004, now U.S. Pat. No. 7,660,840, incorporated herein by reference in its entirety; and "Method, System, and Computer Program Product for Executing SIMD Instruction for Real/Complex FFT Conversion," U.S. patent application Ser. No. 10/953,584, filed Sep. 30, 2004, now U.S. Pat. No. 7,676,533, incorporated herein by reference in its entirety.

A review of the instructions described in the above-referenced applications is presented below.

1. [CMULH] SIMD Instruction for Complex Multiplication

In an embodiment of the present invention, a Single Instruction Multiple Data (SIMD) technique is provided for multiplying, at an execution unit of a processor, two complex numbers in which all four scalar multiplications, concomitant to multiplying two complex numbers, can be performed in parallel. First data is conveyed along at least a first interconnect of the processor. The first data has a first operand. The first operand represents a first complex number. Second data is conveyed along at least a second interconnect of the processor. The second data has a second operand. The second operand represents a second complex number. The first operand is multiplied at the execution unit by the second operand to produce a first result. The first result represents a third complex number.

The processor can multiply the first operand by the second operand in the following manner. The least significant bits (real) portion of the first operand can be multiplied at the execution unit by the least significant bits (real) portion of the second operand to produce a third (real) operand. The most significant bits (imaginary) portion of the first operand can be multiplied at the execution unit by the most significant bits (imaginary) portion of the second operand to produce a fourth (real) operand. The fourth (real) operand can be subtracted at the execution unit from the third (real) operand. A fifth (real) operand can be a difference of the subtracting. The most significant bits (imaginary) portion of the first operand can be multiplied at the execution unit by the least significant bits (real) portion of the second operand to produce a sixth (imaginary) operand. The least significant bits (real) portion of the first operand can be multiplied at the execution unit by the most significant bits (imaginary) portion of the second operand to produce a seventh (imaginary) operand. The seventh (imaginary) operand can be added at the execution unit to the sixth (imaginary) operand. An eighth (imaginary) operand can be a sum of the adding. Advantageously, the four scalar multiplications can be performed in parallel. Advantageously, the subtraction and the addition can also be performed in parallel.

Optionally, the present invention can also be extended so that a single instruction causes multiplication operations to be performed on additional pairs of complex numbers. In addition to the first operand, the first data can also have a ninth operand. The ninth operand can represent a fourth complex number. The ninth operand can be a most significant bits portion of the first data. The first operand can be a least significant bits portion of the first data. In addition to the second operand, the second data can also have a tenth operand. The tenth operand can represent a fifth complex number. The tenth operand can be a most significant bits portion of the second data. The second operand can be a least significant bits portion of the second data. The ninth operand can be multiplied at the execution unit by the tenth operand to produce a second result. The second result can represent a sixth complex number. The first result and the second result can be third data. The first result can be a least significant bits portion of the third data. The second result can be a most significant bits portion of the third data. Advantageously, multiplying the first operand by the second operand can be performed in parallel with multiplying the ninth operand by the tenth operand.

In an example implementation, the instruction is called CMULH (short for Complex-MULtiply-Halfwords), but the mnemonic used is incidental. One or more examples of this SIMD instruction are described in U.S. patent application Ser. No. 10/951,867, entitled "Methods for Performing Multiplication Operations on Operands Representing Complex Numbers," filed Sep. 29, 2004, now U.S. Pat. No. 7,546,329, incorporated herein by reference in its entirety.

2. [CMACH et al] SIMD Instructions for Complex Multiply-Accumulate

In another embodiment of the present invention, SIMD techniques are provided for multiplying, at an execution unit of a processor, two complex numbers in which a real part and an imaginary part of a product of the multiplying can be stored in the same register of the processor. First data is conveyed along at least a first interconnect of the processor. The first data has a first operand. The first operand represents a first complex number. Second data is conveyed along at least a second interconnect of the processor. The second data has a second operand. The second operand represents a second complex number. The first operand is multiplied at the execution unit by the second operand to produce a first result. The first result represents a third complex number. Third data is stored at a first register of the processor. The third data has the first result. The first result has at least the product of the multiplying.

Optionally, fourth data can be conveyed along at least a third interconnect of the processor. Here, the fourth data can have a third operand. The third operand can represent a signal that prevents the execution unit from altering the first result.

Optionally, the execution unit can alter the first result so that the first result represents a negative of the third complex number. For example, a second register of the processor can have fifth data. The fifth data can have a fourth operand. The fourth operand can represent zero. The first result can be altered by subtracting, at the execution unit, the first result from the fourth operand so that the first result represents a difference of the subtracting. Again, a signal can optionally be conveyed that causes the execution unit to alter the first result so that the first result represents a negative of the third complex number.

Optionally, the first register can have sixth data. The sixth data can have a fifth operand. The fifth operand can represent a fourth complex number. The first result can be added at the execution unit to the fifth operand so that the first result represents a sum of the adding. Again, a signal can optionally be conveyed that causes the execution unit to add the first result to the fifth operand so that the first result represents a sum of the adding.

Optionally, the first register can have seventh data. The seventh data can have a sixth operand. The sixth operand can represent a fifth complex number. The first result can be subtracted at the execution unit from the sixth operand so that the first result represents a difference of the subtracting. Again, a signal can optionally be conveyed that causes the execution unit to subtract the first result from the sixth operand so that the first result represents a difference of the subtracting.

Optionally, the present invention can also be extended so that a single instruction causes multiplication operations to be performed on additional pairs of complex numbers. In addition to the first operand, the first data can also have a seventh operand. The seventh operand can represent a sixth complex number. The seventh operand can be a most significant bits portion of the first data. The first operand can be a least significant bits portion of the first data. In addition to the second operand, the second data can also have an eighth operand. The eighth operand can represent a seventh complex number. The eighth operand can be a most significant bits portion of the second data. The second operand can be a least significant bits portion of the second data. The seventh operand can be multiplied at the execution unit by the eighth operand to produce a second result. The second result can represent an eighth complex number. The third data can be the first result and the second result. The first result can be a least significant bits portion of the third data. The second result can be a most significant bits portion of the third data. Advantageously, multiplying the first operand by the second operand can be performed in parallel with multiplying the seventh operand by the eighth operand.

In an example implementation, the SIMD instructions are called CMACH, CMZCH, CMDCH, and CMNCH, but the mnemonics used are incidental. One or more examples of these SIMD instructions are described in U.S. patent application Ser. No. 10/953,421, entitled, "Methods for Performing Multiply-Accumulate Operations on Operands Representing Complex Numbers," filed Sep. 30, 2004, now U.S. Pat. No. 7,546,330, incorporated herein by reference in its entirety.

3. [BFLYH] SIMD Instruction for Flexible FFT Butterfly

In another embodiment of the present invention, SIMD techniques are provided for performing FFT butterfly operations. As such, the present invention includes an FFT butterfly instruction that can reduce the number of cycles needed for software to perform FFT computations using FFT butterfly operations.

In an embodiment, one instance of an FFT butterfly operation is performed on one instance of a set of complex values. In another embodiment, the FFT butterfly instruction implements in parallel two instances of the FFT butterfly operation, i.e., 2-way SIMD, over two instances of a set of complex values at once. In other embodiments, 4-way SIMD, 8-way SIMD, or the like are implemented with a corresponding quantity of instances of the FFT butterfly operation.

The exact behavior of the FFT butterfly instruction is controlled either by means of a separate control register, by means of a variant opcode, or by a combination of the two means. The contents of the control register may be altered by the programmer, or a different opcode can be selected, to configure the butterfly behavior to suit specific circumstances. In an embodiment, the control register and/or variant opcode specifies four operation parameters that are implemented to manage the precise behavior of the FFT butterfly instruction. The operation parameters include scaling, replication, conjugation, and interleaving. In an embodiment, the control register includes four control bits, one for specifying each operation parameter.

In an example implementation, the FFT butterfly instruction is used in the software on a processor in a chip-set implementing the central-office modem end of a digital subscriber line (DSL) link. The FFT butterfly instruction can also be used in other contexts where an FFT function is to be performed (and/or where an FFT butterfly operation is used) including systems that do not implement DSL or discrete multi-tone (DMT) modulation and de-modulation.

In an example implementation, the instruction is called BFLYH (short for ButterFLY on Halfwords), but the mnemonic used is incidental. One or more examples of this SIMD instruction are described in U.S. patent application Ser. No. 10/952,169, entitled, "Method, System, and Computer Program Product for Executing SIMD Instruction for Flexible FFT Butterfly," now U.S. Pat. No. 7,660,840, filed Sep. 29, 2004, incorporated herein by reference in its entirety.

4. [BFLYH-CVT] SIMD Instruction for Real/Complex FFT Conversion

In another embodiment of the present invention, SIMD techniques are provided for performing an FFT computation. As such, the present invention includes an FFT conversion instruction that reduces the number of cycles needed to perform a conversion stage during an inverse or forward FFT computation. In an embodiment, the FFT conversion instruction of the present invention is implemented such that (typically using pipelining in the processor) a new instance of the FFT conversion instruction can be initiated every processor cycle, which reduces the cost of the conversion operation for a more efficient FFT computation.

In an embodiment, the FFT conversion instruction is executed during one stage of an FFT computation that performs an inverse FFT between N "complex" frequency-domain points and 2N "real" time-domain points. First, a standard representation or standard form of complex frequency-domain data is accessed for input. The standard form of frequency-domain data includes N points of complex amplitudes of distinct component frequencies. Next, the N points of complex frequency-domain data are "converted," by executing the FFT conversion instruction of the present invention one or more times, into a modified data structure that includes N points of modified complex frequency-domain data. An N-point inverse FFT is performed on the N points of modified complex frequency-domain data to produce N points of complex time-domain data. Thereafter, the N points of complex time-domain data are rearranged by interleaving the N real and N imaginary data values of the complex data into a 2N-point output array which can represent purely real time-domain data values.

In another embodiment, the FFT conversion instruction is executed during one stage of an FFT computation that performs a forward FFT between 2N real time-domain points and N complex frequency-domain points. First, a 2N-point array of real time-domain data is accessed for input. Next, the 2N points of real time-domain data are allocated alternately to real and imaginary parts of an N-point FFT input data array that is considered as N points of complex time-domain data. An N-point forward FFT is performed on the N points of complex time-domain data to produce a modified data structure that includes an N-complex-point array of modified complex frequency-domain data. The modified complex frequency-domain data is then converted, by executing the FFT conversion instruction of the present invention one or more times, into a standard representation or a standard form of complex frequency-domain data.

As discussed above, the conversion operation of the present invention converts between a standard form and a modified form of complex frequency-domain data. In an embodiment, the FFT conversion instruction directly implements two instances of the FFT conversion operation (i.e., 2-way SIMD) over two sets of complex points at once. In another embodiment, the FFT conversion instruction implements one instance of the FFT conversion operation, over two complex points at once. In other embodiments, the FFT conversion instruction of the present invention can implement larger numbers of instances of the FFT conversion operation at once, for example over four or eight sets of complex points.

To control behavior of the FFT conversion instruction, a separate control register is provided to control an "inverse" flag. The control register contains a control bit that is utilized to select between forward and inverse FFT context. In another embodiment, variant opcodes are utilized to give behavioral control of the conversion operation, e.g. an FFT conversion instruction using one opcode can be used to perform a forward FFT conversion and an FFT conversion instruction using a different opcode can be used to perform an inverse FFT conversion.

In an example implementation, the SIMD instruction is implemented as a variation in function of the above-described instruction called BFLYH, but the mnemonic used is incidental: an instruction specifically for this purpose might also be called BFLYCH, or BFLYH-CVT, or indeed any other name. One or more examples of this SIMD instruction are described in U.S. patent application Ser. No. 10/953,584, entitled, "Method, System, and Computer Program Product for Real/Complex FFT Conversion," filed Sep. 30, 2004, now U.S. Pat. No. 7,676,533, incorporated herein by reference in its entirety.

B. SIMD Processing

SIMD stands for "Single Instruction Multiple Data" and describes a style of digital processor design in which a single instruction can be issued to control the processing of multiple data values in parallel (all being processed in the same manner).

In an embodiment, the SIMD operations of the present invention are implemented on a digital processor, such as the FirePath™ processor developed by Broadcom Corporation (Irvine, Calif.), and implemented in devices such as the BCM6510 and BCM6411 chips produced by Broadcom Corporation. The SIMD operations are implemented by data processing units which receive multiple input values, each 64 bits wide but capable of being logically subdivided into and treated as multiple smaller values (e.g., 8×8-bit values, 4×16-bit values, or 2×32-bit values).

To illustrate the principles of SIMD working, consider the following instruction that is executable on the FirePath™ digital processor produced by Broadcom Corporation (Irvine, Calif.):

ADDH c, a, b

Figure 8:
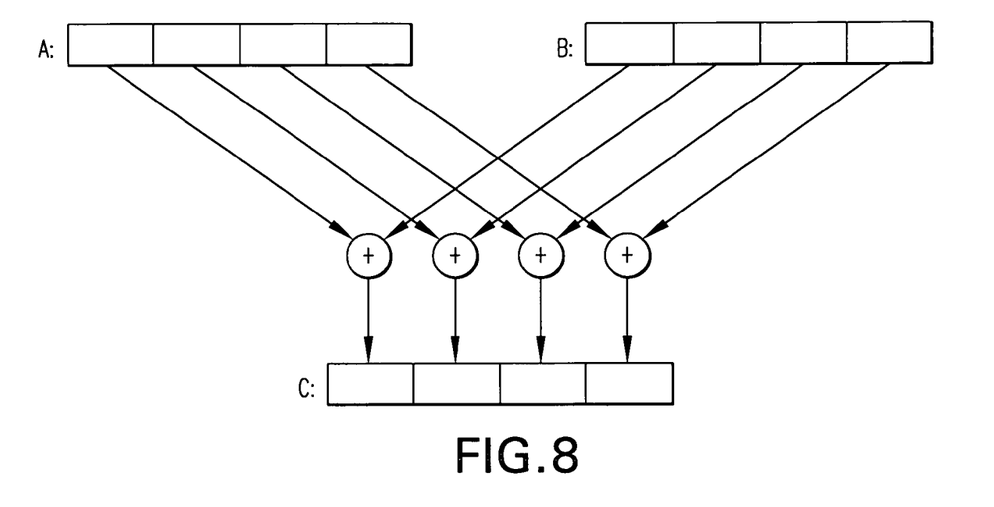
FIG. 8 is a block diagram of an execution of a SIMD add halfwords instruction.

The instruction mnemonic ADDH is an abbreviation for "Add Halfwords", where a halfword is the term used for a 16-bit quantity on the FirePath™ processor. The instruction "ADDH c, a, b" takes as input two 64-bit operands from registers a and b, and writes its result back to register c. ADDH performs four 16-bit ("half-word") additions: each 16-bit value in a is added to the corresponding 16-bit value within b to produce 4×16-bit results in the 64-bit output value c, as illustrated in FIG. 8.

This SIMD method of working allows for a great increase in computational power compared with earlier types of processors where an instruction can only operate on a single set of input data values (e.g., one 16-bit operand from a, one 16-bit operand from b giving one 16-bit result in c). For situations—common in digital signal processing applications—where the same operation is to be performed repeatedly across an array of values, it allows in this instance a speed-up by a factor of four in the basic processing rate, since four add operations can be performed at once rather than only one.

II. Processor Execution Unit for Complex Operations

The SIMD method of working allows for a great increase in computational power compared with earlier types of processors where an instruction can only operate on a single set of input data values. A new SIMD execution unit has been devised, which keeps low the circuit cost of implementing the above-described new instructions as well as existing SIMD multiply and MAC-type instructions. It does so by re-using various functional blocks in different combinations, rather than by implementing each type of instruction separately.

Also, in particular by implementing the instructions in a multi-stage pipeline, the total computational power available (total rate of issue of primitive operations) is increased compared with more conventional execution unit designs where the complicated instructions might be separated into sequences of simpler instructions, but which could therefore take more cycles to issue, and hence to execute overall.

The increase in latency incurred by the multi-stage pipeline (compared to conventional designs) might be considered a problem in the situation where only few general purpose registers were available (e.g., 16 or fewer). However, this execution unit is being applied in a context of an architecture where there are many general registers (e.g., 64) so it is usually possible for a program to keep executing new instructions feeding more operands into the pipeline, while waiting for earlier issued instructions to complete and return their results. Thus, it allows high performance to be achieved.

III. Example Implementation

Figure 1:
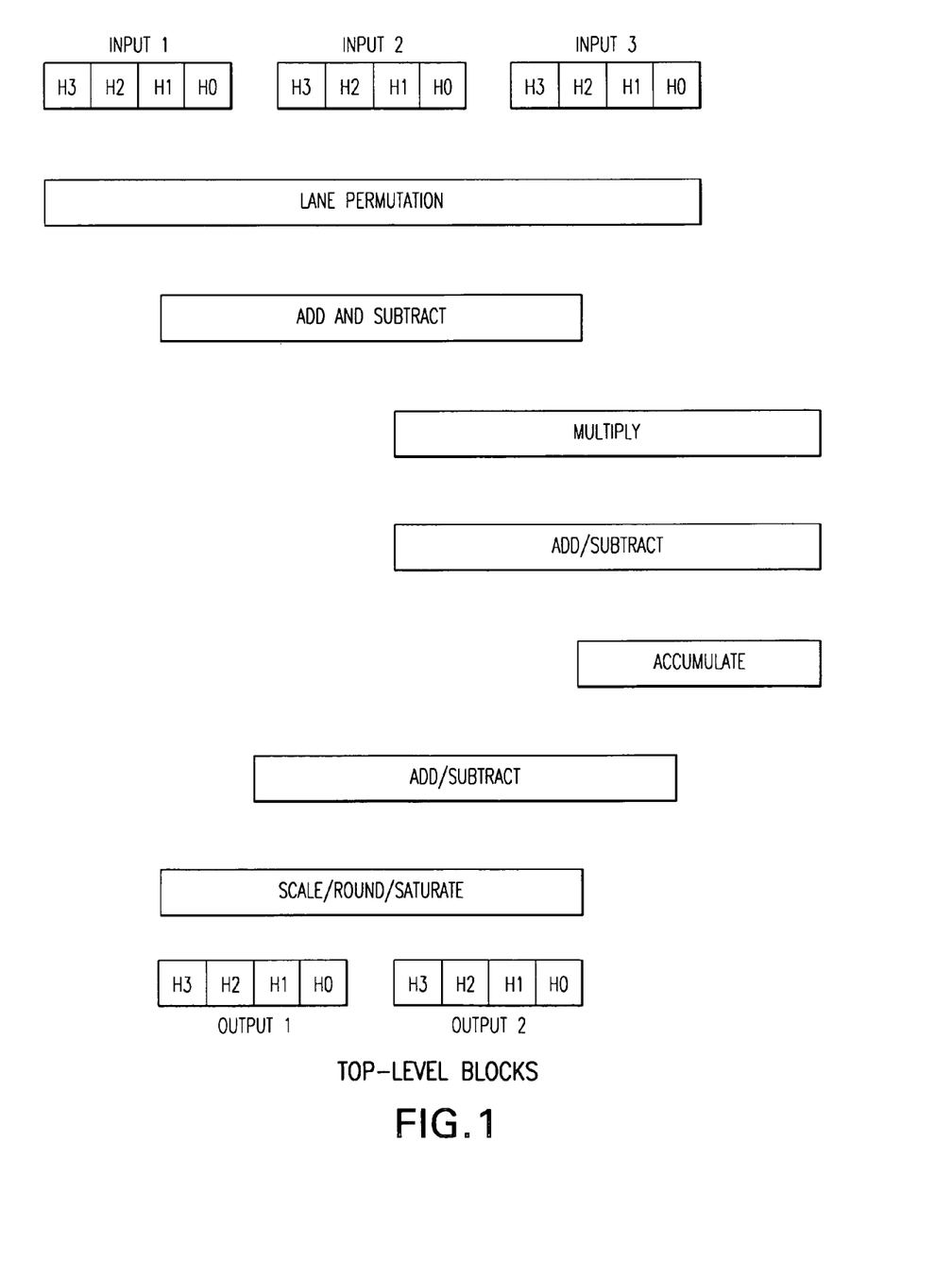
FIG. 1. is a block diagram of top-level blocks of an execution unit according to the present invention.

FIG. 1 shows the top level structure of the execution unit; it accepts up to 3 input operands (at top of figure): the number of input operands used depends on which instruction is to be executed. It contains internal functional blocks as shown. Instructions fall into two classes; those (including CMACH, CMZCH, etc.) which store their result in an accumulator register (marked as "accumulator(s)"), and those which return a result to the main processor register file. For the latter class, the results appear in the output1 or output1 and output2 operands (at bottom of FIG. 1).

Figure 2:
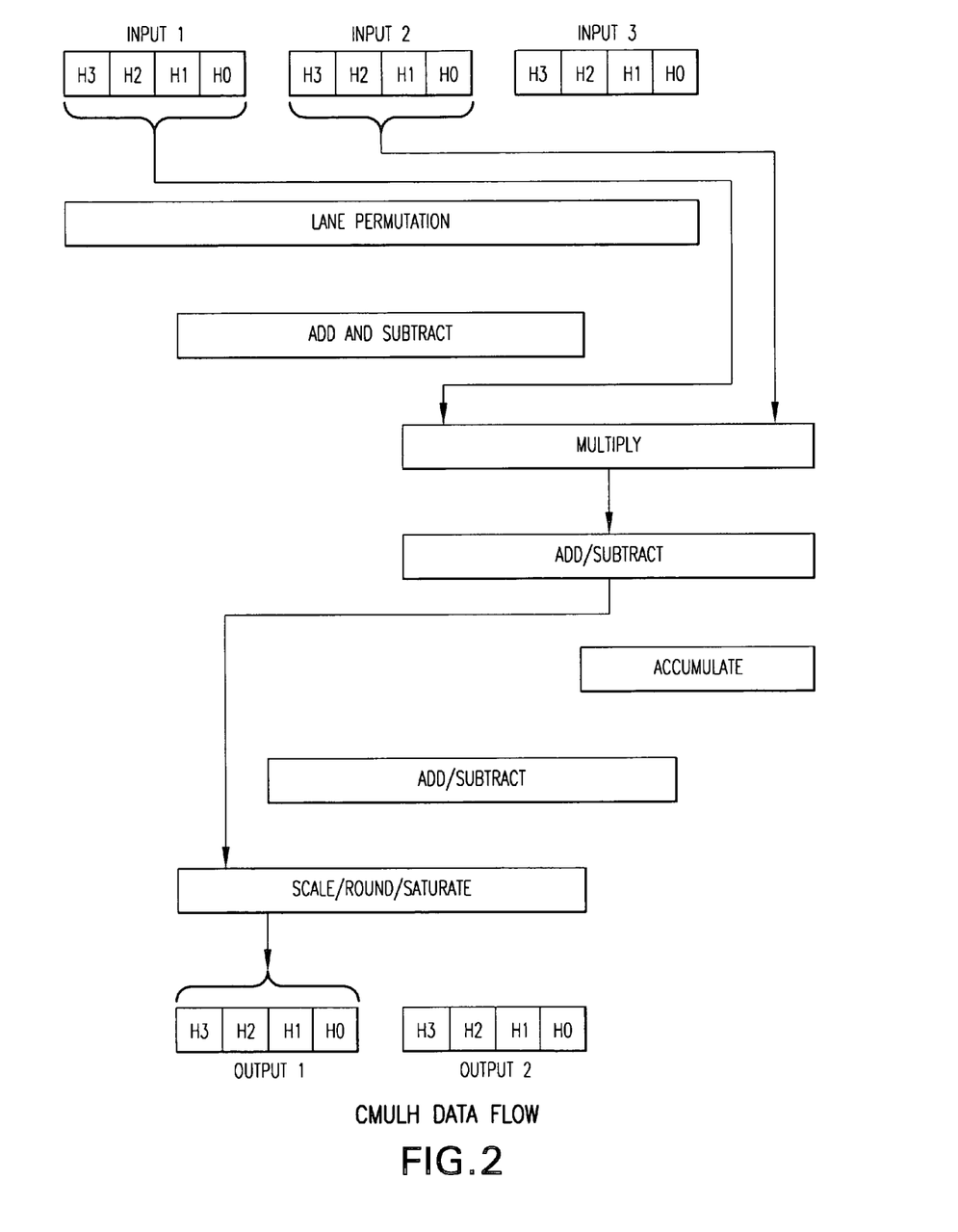
FIG. 2 is a process flowchart illustrating data flow for a CMULH instruction.
Figure 3:
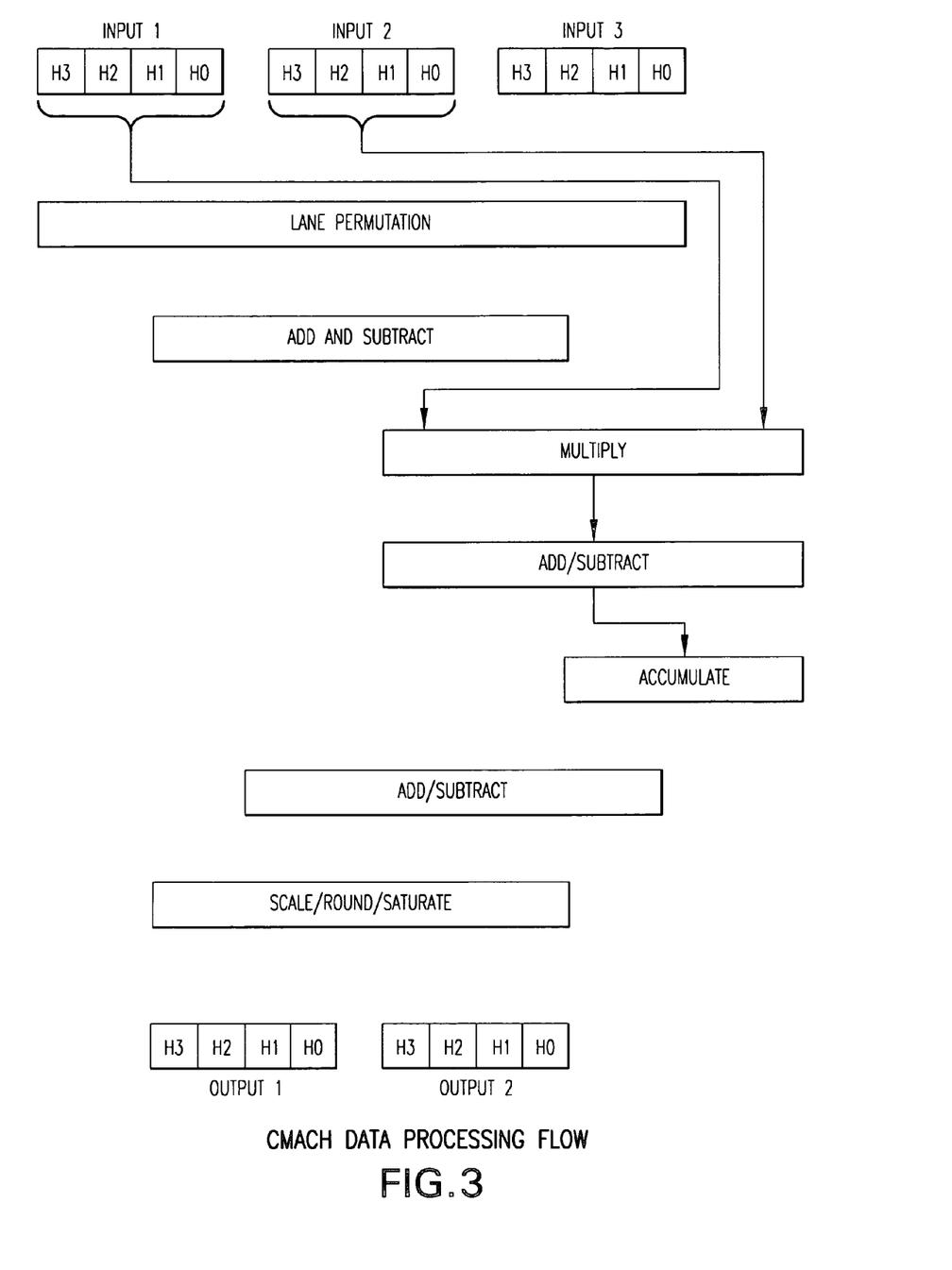
FIG. 3 is a process flowchart illustrating data flow for a CMACH instruction.
Figure 4:
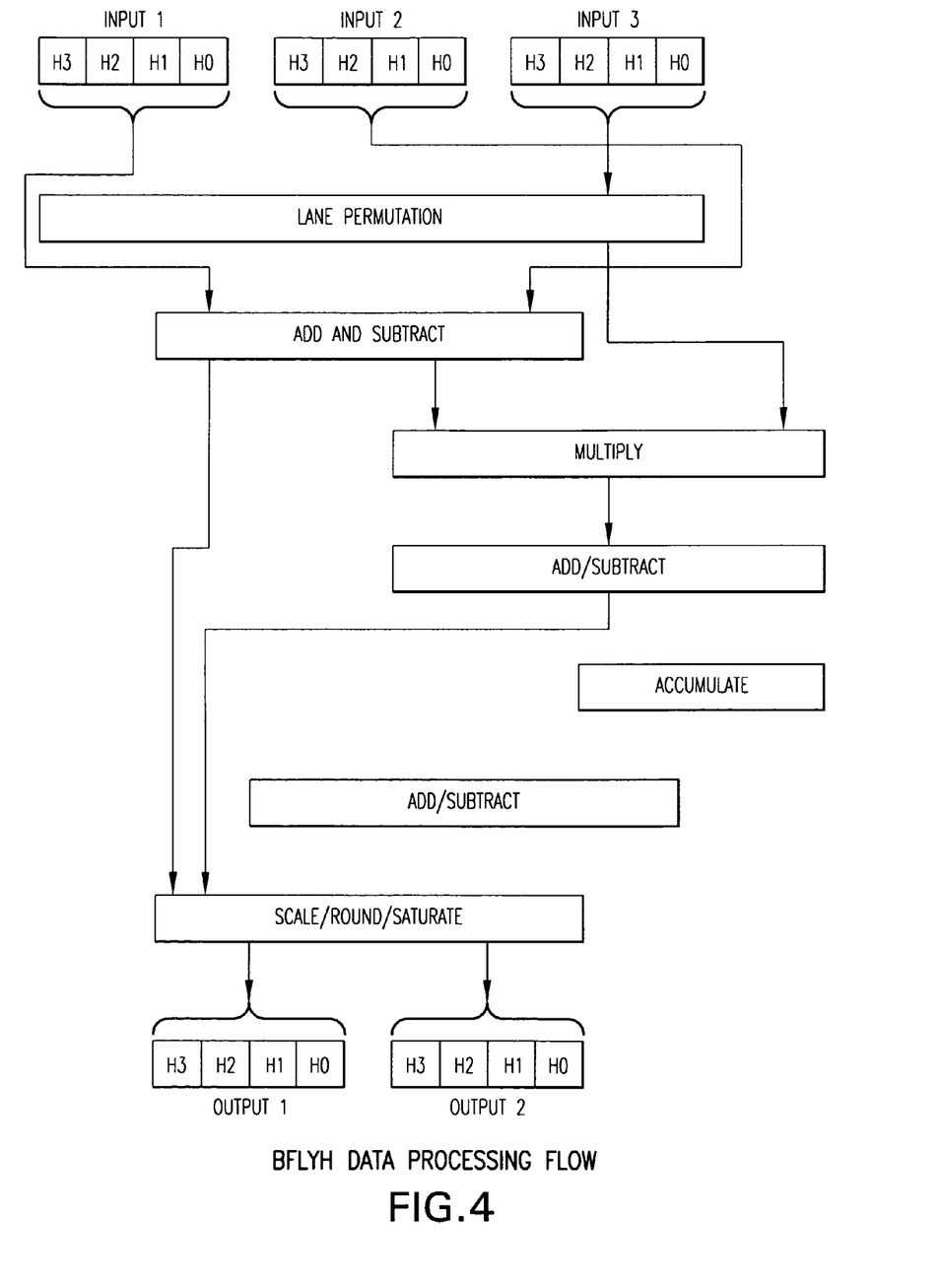
FIG. 4 is a process flowchart illustrating data flow for a BFLYH instruction.
Figure 5:
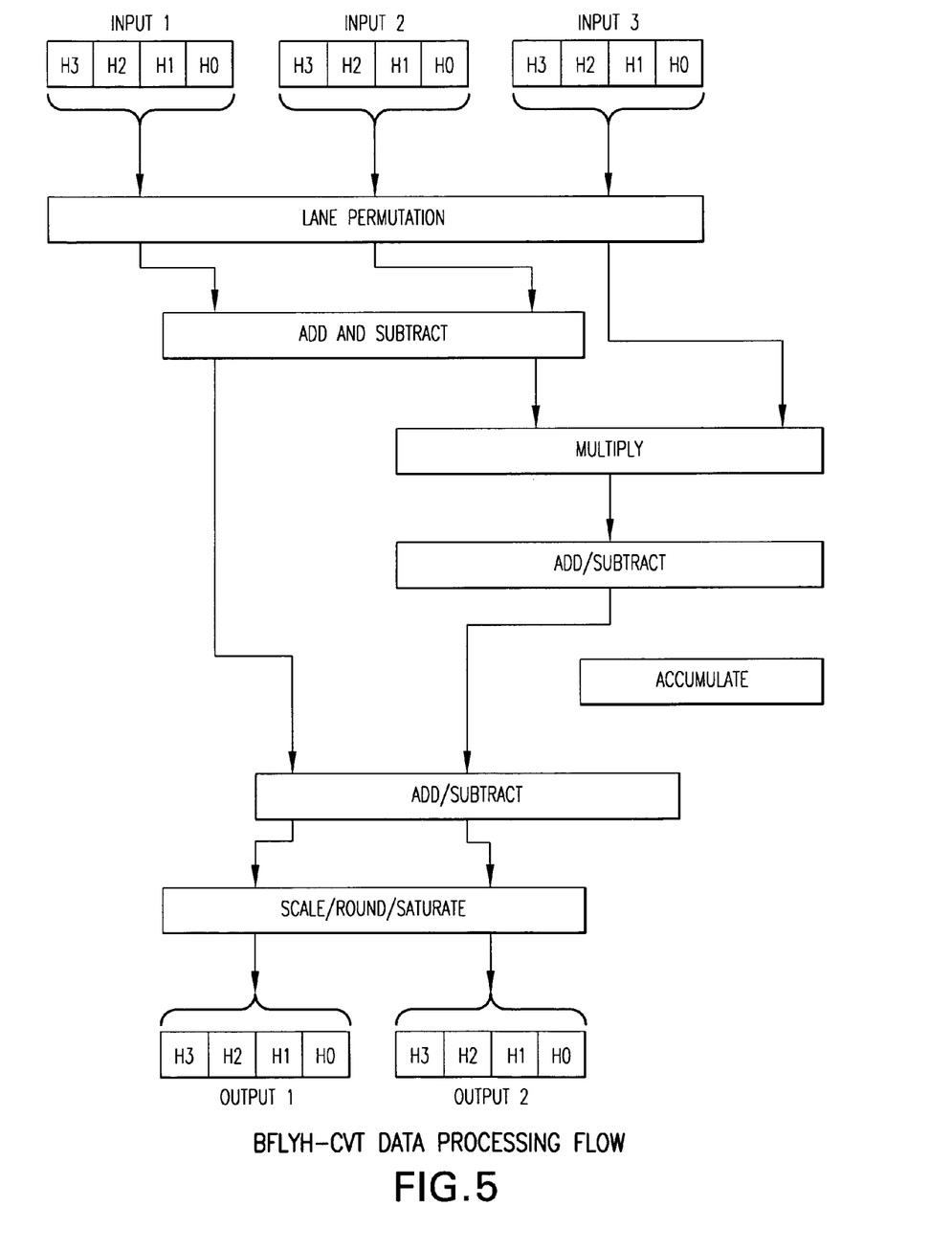
FIG. 5 is a process flowchart illustrating data flow for a BFLYH-CVT instruction.

The way these blocks are configured by execution of each class of instruction is shown in FIGS. 2 through 5. FIG. 2 shows the flow of data processing in the implementation of the CMULH instruction described above; FIG. 3 shows the flow of data processing in the implementation of the CMACH and similar instructions described above; FIG. 4: shows the flow of data processing in the implementation of the BFLYH instruction described above; FIG. 5 shows the flow of data processing in the implementation of the BFLYCH instruction (also known as BFLYH-CVT, or as a variation on BFLYH) described above.

Figure 6:
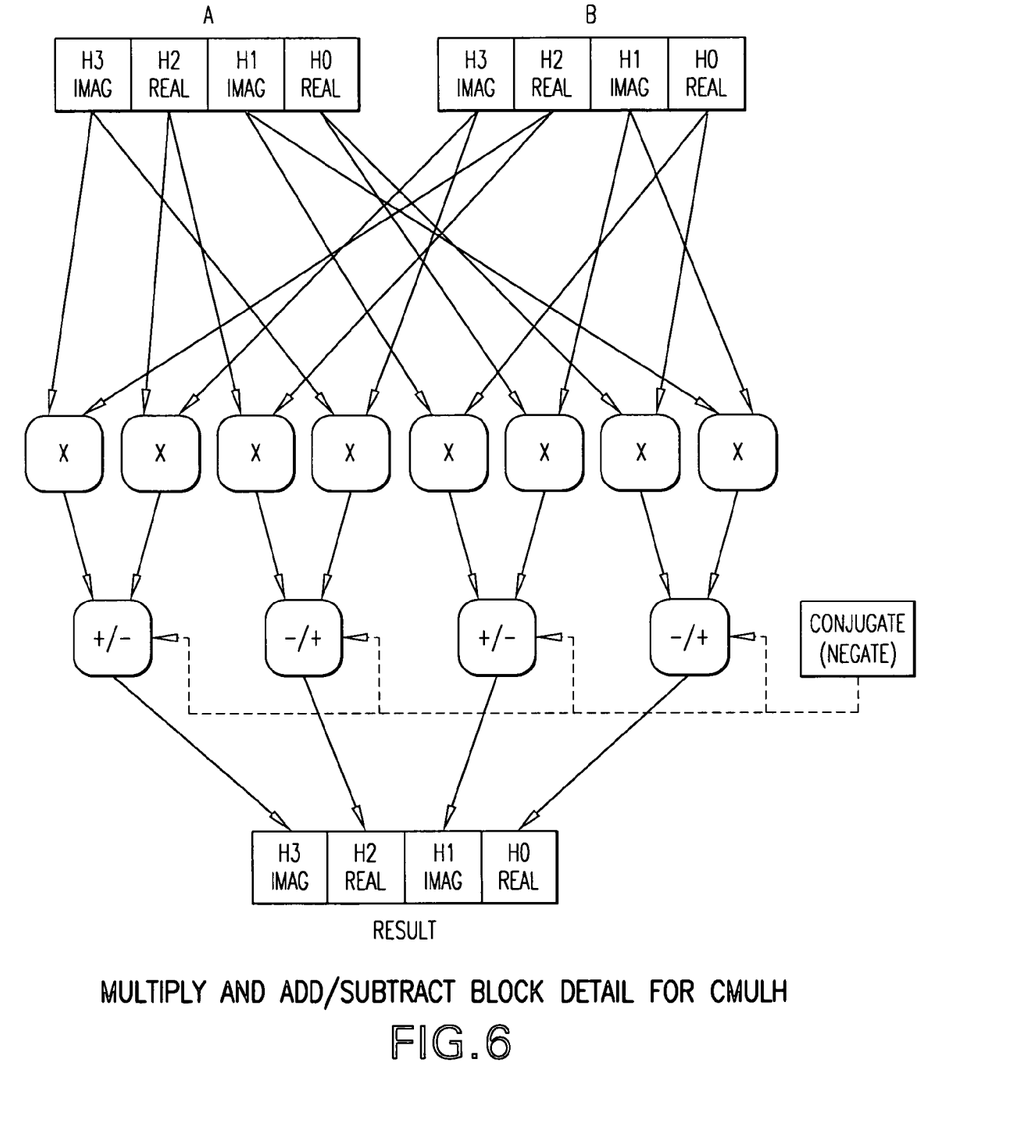
FIG. 6 is a process flowchart illustrating data flow for multiply and add/subtract details of the CMULH instruction.

FIG. 6 shows more detail of the internal configuration of the multiply and add/subtract blocks used in implementation of the CMULH instruction. (Note: the result value shown at the bottom of the figure is the output from the add/subtract block only, not the output from the whole instruction.)

Figure 7:
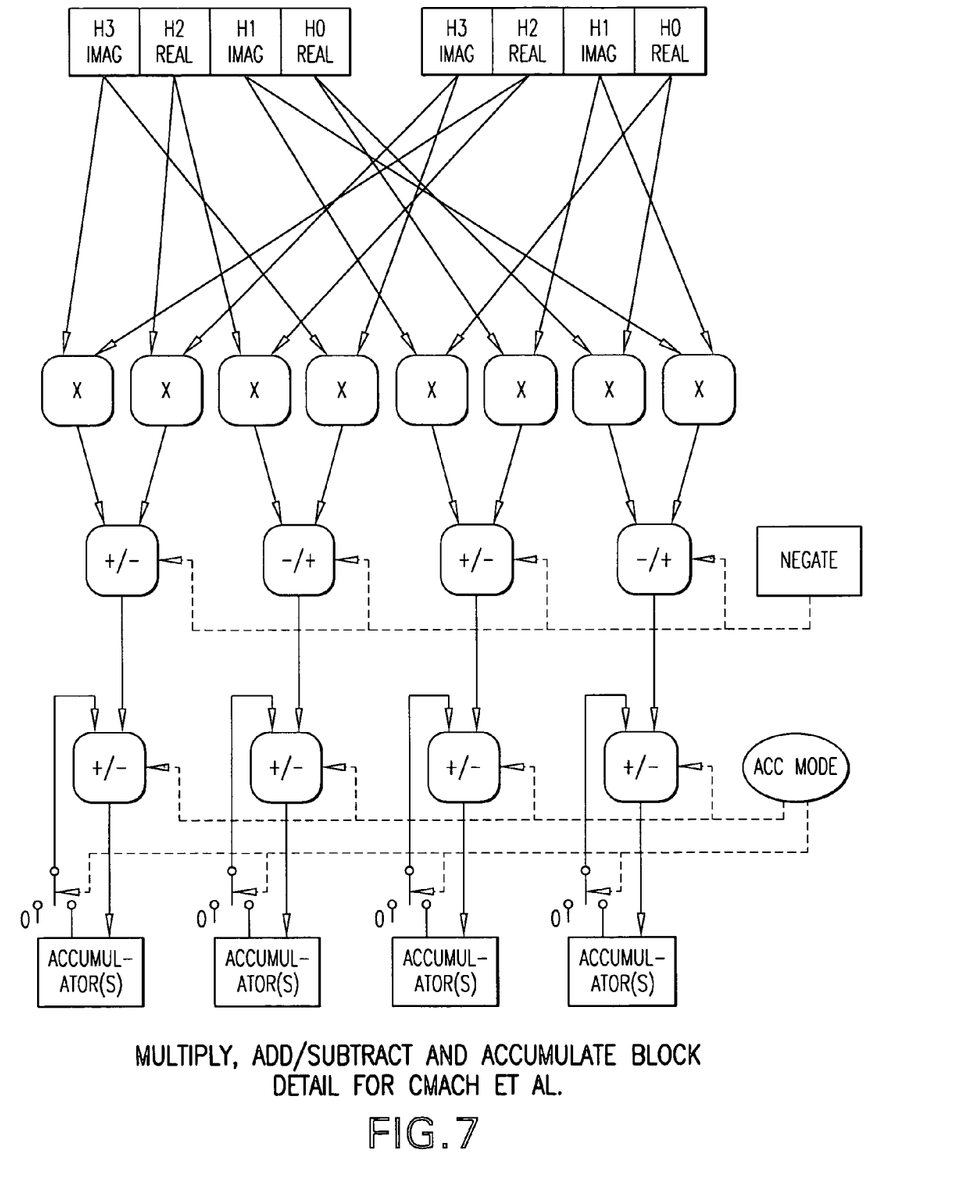
FIG. 7 is a process flowchart illustrating data flow for multiply, add/subtract and accumulate details for CMACH et al.

FIG. 7 shows more detail of the internal configuration of the multiply, add/subtract and accumulate blocks for implementation of the CMACH-class instructions. Note that the exact behavior of the complex execution unit is controlled by means of different elements. The class of instruction being executed—e.g., CMACH et. al. or CMULH or BFLYH—as is commonly represented by an opcode portion of an instruction, is one source of configuration control of the unit, as per the figures. Note also that the settings of a control register can be another source of control for behavior of the execution unit. The control register is not shown explicitly in the diagrams, except for the control bit which determines the direction of complex multiply (normal vs. "conjugate" mode, where "conjugate may also be referred to as "negate" or "inverse"). Finally note that the detailed variant of each class of instruction: i.e., one of CMACH or CMDCH or CMZCH or CMNCH—can be used to control the "acc mode" in FIG. 7.

Reference should further be made to the detailed specification of the individual instructions, as described by the respective documents identified above, to observe the use of each block.

Note that the execution unit can also be configured to execute more conventional simpler instructions such as MULH (4-way SIMD multiply) and various instances of MACH-type instructions (4-way SIMD scalar multiply-accumulate).

Figure 9:
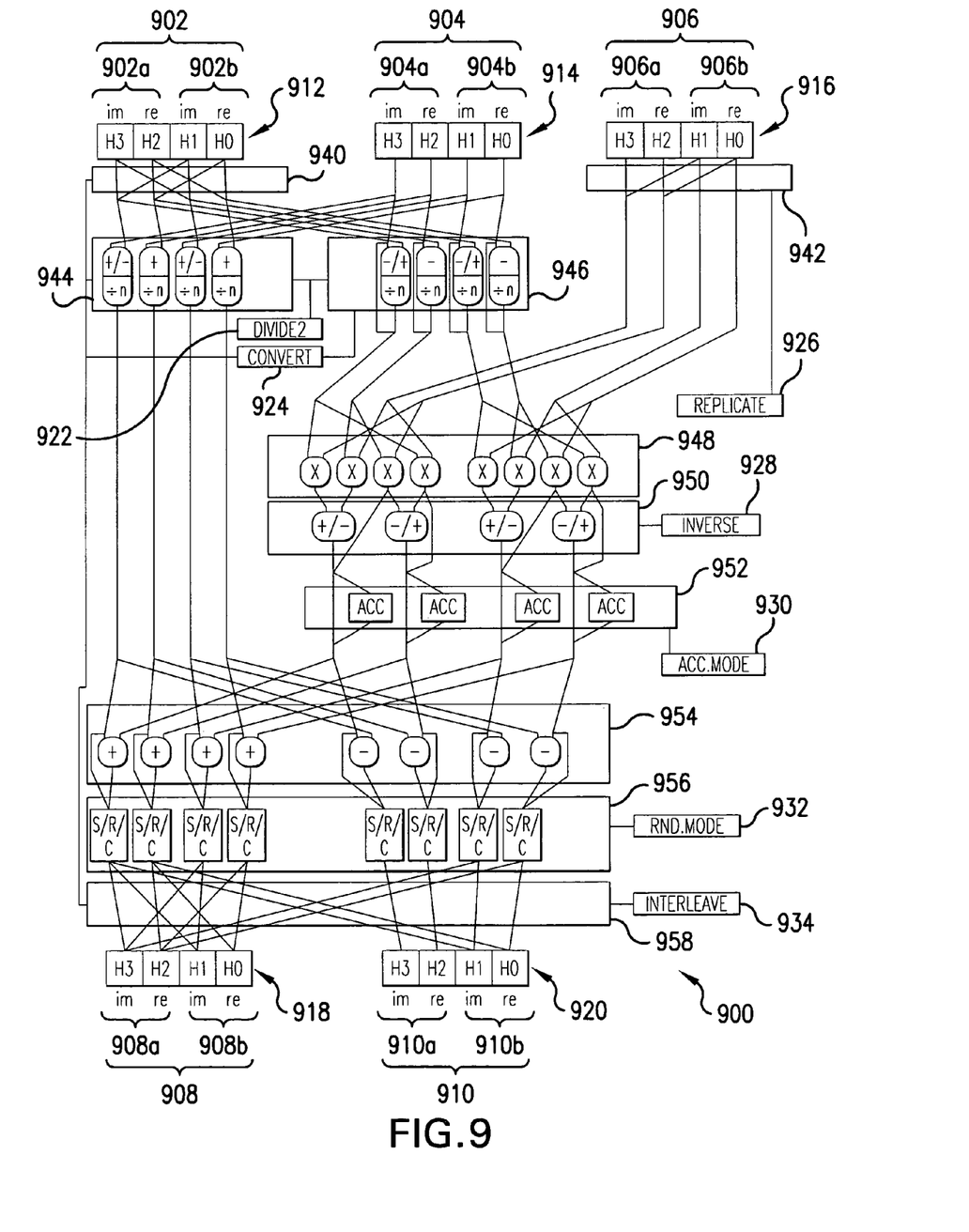
FIG. 9 is a process flowchart illustrating multiple possible data flow paths through the various functional parts of the complex execution unit.

The execution unit of the present invention has been described above in relation to the individual instruction implementations of the above-referenced inventions. Referring now to FIG. 9, consider a process flowchart 900 illustrating possible data flow paths through all the various functional parts of one embodiment of the present invention, in a more detailed way than FIGS. 1 through 5 illustrate. The embodiment of the execution unit of the present invention that is shown has a 2-way SIMD form, in that it performs processing of two instances of each of the input complex values, in parallel. However, it should be understood that this is by way of example only: it is possible to construct other forms of the present invention, using other numbers of SIMD ways (e.g., 4-way, 8-way), and also supporting a single way (non-SIMD) form in which each input and output operand of the execution unit represents one complex number.

Referring to FIG. 9, data values in course of processing flow from top to bottom, from input values at the top (as input operands 912, 914 and 916, representing input values 902, 904 and 906 respectively) through the various functional elements, down to output operands 918 and 920, representing output values 908 and 910 respectively. Control signals such as "Inverse", "Convert", etc may flow in any direction, but always away from the control signal source (922, 924, 926, 928, 930, 932, 934) towards the functional blocks they control.

The most complex configuration of the execution unit supports the above-described real/complex FFT conversion instruction (called BFLYCH, or BFLYH-CVT, or a variation of BFLYH). The control signal "Convert" 924 in particular is used to direct the operations of various functional units in an appropriate manner, including: (a) the conversion permute unit 940, which reverses the order of the complex numbers in the input operand 912; (b) the adder/subtracter unit 944, and the subtracter/adder unit 946, in respect of (i) causing the individual adder, subtracter, and adder/subtracter units to perform additions or subtractions as required, and (ii) causing the divide-by-n function to act to divide the results of each of the addition or subtraction operations by 2; and (c) the interleaver unit 958, which in this configuration acts to reverse the order of the complex numbers of the output as they are transferred out to the output operand 918. In this configuration, in an embodiment, the Replicate function of replicate unit 942 is inactive; also, the accumulation function of accumulator unit 952 is bypassed, the scale/round/clip ("S/R/C") functions of fixing unit 956 are set to a default mode, and the interleaver function of interleaver unit 958 is inactive. In one embodiment, configuration for use of the conversion instruction can be performed by having a separate opcode for this instruction (e.g., using the mnemonic BFLYCH), identification of which generates a suitable value of the control signal "Convert" 924. In another embodiment, the signal "Convert" 924 is derived from a control register, which is separately programmed. The only other control signal which is normally varied in the case of the BFLYCH instruction is the "Inverse" signal 928 which may be also known as "Conjugate" (or BSR.Conjugate); this is used to control the direction of FFT conversion operation that is performed, one appropriate for the forward FFT, or one appropriate for the inverse FFT.

The next configuration to consider is that for the above-described FFT butterfly instruction BFLYH. In this case, conversion permute unit 940 is inactive, and the two sets of input data complex points 902 and 904 are received, both unmodified in order, via operands 912 and 914 respectively, at both the adder/subtracter unit 944 and subtracter/adder unit 946. Replicate unit 942 is available to perform replication of twiddle factor values supplied as input 906 in input operand 916, if required, under control of the "Replicate" signal 926. Adder/subtracter unit 942 and subtracter/adder unit 946 in this configuration perform only additions and subtractions respectively, but the divide-by-n functionality is controllable to perform divide-by-1 (unity gain) or divide-by-2 (gain of ½), by means of the control signal "Divide2" 922, to allow gain of these units to be adjusted to control overflow in the FFT stage, if required. The control signal "Divide2" 922 may be derived either from a control register or by means of a variation in opcode. The multiplier unit 948 and complex adder unit 950 together perform complex multiplication; the direction of transform is controlled by using control signal "Inverse" 928 to perform a conjugated form of the complex multiplication, if required. Again in this configuration the accumulator function of accumulator block 952 is bypassed. In addition, in this configuration the adder and subtracter units of adder&subtracter block 954 are bypassed, and the outputs of the adder/subtracter block 944 and the complex addition unit 950 are processed by the scaling/rounding/clipping functions in fixing unit 956, under optional control of control signal "Rnd.mode" 932. The outputs from the fixing unit 956 are passed to the interleaver unit 934 where interleaving may optionally be applied under control of control signal "Interleave" 934. As with all control signals in this figure, this control signal may be derived from a control register, or from identification of a variant opcode for the instruction, or a combination of both. The results from interleaver unit 958 are then produced as output operands 918 and 920, representing the two sets of output complex values 908 and 910.

The next configuration to be described is intended to support the above-described complex multiplication (CMULH) instruction. In this case the two sets of complex values to be multiplied, forming input values 904 and 906, are received as operand 914 and operand 916: input 902 is not supplied and hence operand 912 is not used; neither is subtracter/adder unit 944. Furthermore, the subtracter/adder unit 946 is inactive and bypasses its input from operand 914 directly to its output. In one embodiment, input operand 906 is not modified before being passed to complex multiplier unit 948. In another embodiment, control signal "Replicate" 926 may be activated in order to replicate one of the complex numbers in input 906 into both of the two complex value positions. The complex multiplier unit 948 and complex adder unit 950 together perform a complex multiplication. In this stage, if desired, control signal "Inverse" 928 (which might also be known as "Conjugate" or "BSR.Conjugate", or "Negate", although the actual name used, if any, does not matter, as is true for all of the control signals) may be activated, so as to cause the complex multiplication to produce a result equivalent to using the complex conjugate of the complex numbers of the second input 906. The results of the complex multiplication then pass through the accumulator unit 952, without modification, and also through the subtracter part of the adder&subtracter unit 954, again without modification, into fixing unit 956. At fixing unit 956 the individual scalar parts of the complex values may optionally be scaled, rounded and clipped, as may be required, under control of control signal "Rnd.mod" 932. In one embodiment a default value of the control signal "Rnd.mod" 932 is used in this configuration. In another embodiment, the control signal may be adjusted as required using either a control register, or by means of opcode variation, or a combination of the two. Finally, the output from the fixing unit is passed through the interleaver unit 958 without alteration, and from there into the single output operand 920, representing the output value 910 of the complex multiplication instruction.

Still referring to FIG. 9, the final configuration in respect to the processing of complex values by the execution unit of the present invention is represented in flowchart 900 is for the above-described set of instructions supporting complex multiplication and accumulation. These instructions are referred to, for example, as CMACH, CMZCH, CMNCH and CMDCH (although as in all cases, the actual names or mnemonics of instructions are not significant in respect to the principles of the present invention). The first stages of the processing of data in this instruction are the same as described just above in respect of the complex-multiplication instruction, as far as and including the output of the complex addition unit 950. From that point on, the data flow is different: the output from complex addition unit 950 is passed into the accumulation unit 952 and passes into the individual accumulator blocks within. Referring now to FIG. 7, the lower part of that figure illustrates one embodiment of the accumulator functionality, wherein the four individual scalar parts of the results of the two complex multiplications are accumulated in SIMD (parallel) manner into a set of accumulator registers. By variation of the "acc.mode" control signal 930, which is sub-divided into "add-or-subtract" and "zero-or-accumulator" control parts as shown in FIG. 7, the functions of the four instructions may be performed. As described, the "acc.mode" control signal 930 is derived from the particular opcode used to initiate execution of the instruction concerned. In another embodiment it could instead be derived from a control register, and only one instruction be used to cover all four forms of complex multiplication-and-accumulation function; in yet another embodiment a combination of methods may be used to determine the value of the "acc.mode" control signal 930. The functions of the accumulation unit 952 are also described in U.S. patent application Ser. No. 10/953,421, entitled, "Methods for Performing Multiply-Accumulate Operations on Operands Representing Complex Numbers," filed Sep. 30, 2004, now U.S. Pat. No. 7,546,330, incorporated herein by reference in its entirety. In this embodiment, in order for software to use the accumulated complex values held in the accumulation unit's accumulators, it is necessary also to have a path from the accumulators to the execution unit's output; this is shown in FIG. 9.

Finally, we describe another mode of use of the same execution logic as illustrated in FIG. 9 by flowchart 900, which is to perform conventional SIMD multiplication and SIMD multiply-accumulate (MAC) operations. In this mode, the values in the instructions' inputs 904 and 906 are treated as normal 4-way SIMD scalar values rather than as pairs of complex numbers. Each lane H0, H1, H2 and H3 of each of the two input operands 914 and 916 holds one scalar value. Passing unmodified through (respectively) subtracter/adder unit 946 and replication unit 942, the respective lanes of each operand are multiplied together in a scalar fashion, using half of the individual multiplier functions at complex multiplier unit 948. For example, lane H0 of operand 914 is multiplied by lane H0 of operand 916 at the right-most multiplier function shown in complex multiplier unit 948; similarly lane H1 of operand 914 is multiplied by lane H1 of operand 916 at the second multiplier function from the right. For the upper two lanes, H2 and H3, lane H2 of operand 914 is multiplied by lane H2 of operand 916 at the fifth multiplier function shown in complex multiplier unit 948 (counting from the right), and lane H3 of operand 914 is multiplied by lane H3 of operand 916 at the sixth multiplier function shown in complex multiplier unit 948 (again counting from the right). In this configuration the four other multiplier functions are not active. The four output lanes from the active multiplier functions then pass directly and unmodified through complex addition unit 950, as shown.

Continuing the flow through flowchart 900, in the case of a SIMD scalar multiplication, the four outputs from the multiplication functions pass unmodified through adder&subtracter unit 954 and hence arrive at the fixing unit 956. At fixing unit 956 they may optionally be scaled, rounded and clipped under control of a "Rnd.mode" control signal 932, before being passed unmodified through interleaver unit 958 and hence to output operand 920, to represent the value 910 of the SIMD scalar multiplication instruction. No output is produced in operand 918 in this configuration.

As an alternative, for the case of SIMD scalar multiply-and-accumulate instructions, the multiplication results may instead be accumulated, as controlled by the control signal "acc.mode" 930.

In the above description, different embodiments may used different types of arithmetic, acting on operands in different forms of representation of complex or scalar numbers. For example, one embodiment may used fixed point arithmetic, taking inputs in fixed point format. Another embodiment may use floating point arithmetic, taking inputs in floating point format; in such an embodiment the use of fixing unit 956 may not be required.

V. Conclusions

FIGS. 1-9 are conceptual illustrations useful for explaining the present invention. For example, the present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

It should be understood that aspects of the present invention (including these functional building blocks) could be implemented in hardware, firmware, software, or a combination thereof. In such an embodiment, the various components and steps (or portions thereof) would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention is implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented with any type of communications device including, but not limited to, cable modems, set-top boxes, headends, communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A method, comprising:
    receiving, by a processor, a complex number instruction for execution using Single Instruction Multiple Data (SIMD) processing, the complex number instruction including a plurality of operations;
    accepting, by a processor, a plurality of input operands, the plurality of input operands representing a plurality of real and imaginary portions of a plurality of pairs of complex numbers;
    configuring, by the processor, a subset of at least two functional blocks from a group of functional blocks in the processor to execute the complex number instruction;
    forming, by the processor, a data processing flow defined by a data flow path through the subset of at least two functional blocks to execute the complex number instruction; and
    executing, by the processor, the plurality of operations on the plurality of pairs of complex numbers in a pipeline fashion through the data processing flow, wherein each operation from among the plurality of operations is configured to be executed in parallel upon real and imaginary portions of the plurality of input operands.

2. A non-transitory computer-readable medium having computer-executable instructions stored thereon that, if executed by a computing device, cause the computing device to perform a method comprising:
    receiving a complex number instruction for execution using Single Instruction Multiple Data (SIMD) processing, the complex number instruction including a plurality of operations;
    accepting a plurality of input operands, the plurality of input operands representing a plurality of real and imaginary portions of a plurality of pairs of complex numbers;
    configuring a subset of at least two functional blocks from a group of functional blocks in a processor to execute the complex number instruction;
    forming a data processing flow defined by a data flow path through the subset of at least two functional blocks to execute the complex number instruction; and
    executing the plurality of operations on the plurality of pairs of complex numbers in a pipeline fashion through the data processing flow wherein each operation from among the plurality of operations is configured to be executed in parallel upon real and imaginary portions of the plurality of input operands.

3. A processor, comprising:
    an instruction unit configured to execute a complex number instruction using Single Instruction Multiple Data (SIMD) processing, wherein the complex number instruction includes a plurality of operations, the instruction unit comprising:
    a plurality of functional blocks configured to support execution of the complex number instruction, each functional block from among the plurality of functional blocks comprising:
        a plurality of input ports configured to accept a plurality of input operands, the plurality of input operands representing a plurality of real and imaginary portions of a plurality of pairs of complex numbers;
        a plurality of computational blocks configured to perform the plurality of operations on the plurality of pairs of complex numbers, wherein each operation from among the plurality of operations is configured to be performed in parallel upon real and imaginary portions of the plurality of input operands; and
    a control element of the processor configured to:
        receive the complex number instruction,
        control the plurality of functional blocks to execute the complex number instruction by configuring a first subset of functional blocks comprising at least two functional blocks of the plurality of functional blocks to execute the complex number instruction,
        form a first data processing flow between functional blocks from among the first subset of functional blocks to execute the complex number instruction, wherein operations corresponding to the first subset of functional blocks from among the plurality of operations are executed in a pipeline fashion through the first data processing flow.

4. The processor of claim 3, wherein the plurality of operations comprises a multiplication operation.

5. The processor of claim 3, wherein the plurality of operations comprises a multiplication-and-accumulation operation.

6. The processor of claim 3, wherein the plurality of operations comprises a fixed point operation.

7. The processor of claim 3, wherein the plurality of operations comprises a floating point operation.

8. The processor of claim 3, wherein the plurality of operations comprises an operation in support of performance of a Fast Fourier Transform (FFT).

9. The processor of claim 3, wherein the control element is further configured to direct results of the complex number instruction to a processor register file.

10. The processor of claim 3, wherein the control element is further configured to direct results of the operations corresponding to the first subset of functional blocks to an accumulator register.

11. The processor of claim 3, wherein the plurality of functional blocks comprises a complex multiplier unit.

12. The processor of claim 11, wherein the control element is further configured to control the complex multiplier unit to produce complex conjugate results.

13. The processor of claim 3, wherein the plurality of functional blocks comprises a complex adder unit.

14. The processor of claim 3, wherein the plurality of functional blocks comprises a fixing unit configured to scale, round, and/or clip individual scalar parts of results of the complex number instruction.

15. The processor of claim 3, wherein the control element is further configured to control the plurality of functional blocks to select a second subset of functional blocks comprising at least one functional block from among the first subset of functional blocks to execute a second complex number instruction after execution of the complex number instruction.

16. The processor of claim 15, wherein the control element is further configured to form a second data processing flow between functional blocks from among the second subset of functional blocks to execute the second complex number instruction after execution of the complex number instruction.

17. The processor of claim 16, wherein the control element is further configured to:
cause the first subset of functional blocks to execute the complex number instruction in accordance with the first data processing flow to provide a plurality of output operands, the plurality of output operands representing a second plurality of real and imaginary portions of a second plurality of pairs of complex numbers, and
cause the second subset of functional blocks to execute the second complex number instruction using the plurality of output operands in accordance with the second data processing flow after execution of the complex number instruction.

18. The processor of claim 3, wherein a computational block from among the plurality of computational blocks is configured to perform a first operation from among the plurality of operations, the first operation comprising:
a first computation between a real portion of a first complex number from among a first pair of complex numbers from among the plurality of pairs of complex numbers and a real portion of a first complex number from among a second pair of complex numbers from among the plurality of pairs of complex numbers;
a second computation between an imaginary portion of the first complex number from among the first pair of complex numbers and an imaginary portion of the first complex number from among the second pair of complex numbers;
a third computation between a real portion of a second complex number from among the first pair of complex numbers and a real portion of a second complex number from among the second pair of complex numbers; and
a fourth computation between an imaginary portion of the second complex number from among the first pair of complex numbers and an imaginary portion of the second complex number from among the second pair of complex numbers,
wherein the first computation, the second computation, the third computation, and the fourth computation are performed in parallel.

* * * * *